United States Patent
Tu et al.

(10) Patent No.: US 7,303,424 B2
(45) Date of Patent: Dec. 4, 2007

(54) BATTERY COVER ASSEMBLY FOR PORTABLE ELECTRONIC DEVICE

(75) Inventors: Ying-Liang Tu, Shenzhen (CN); Chia-Hua Chen, Tu-Cheng (TW)

(73) Assignees: ShenZhen FuTaiHong Precision Industry Co., Ltd., Shenzhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/309,858

(22) Filed: Oct. 13, 2006

(65) Prior Publication Data

US 2007/0190829 A1 Aug. 16, 2007

(51) Int. Cl.
- *H01R 13/64* (2006.01)
- *H04M 1/00* (2006.01)
- *G03B 17/04* (2006.01)
- *H01M 2/10* (2006.01)

(52) U.S. Cl. ............... 439/372; 455/575.1; 455/575.8; 429/97; 429/100

(58) Field of Classification Search ............... 439/372, 439/367, 347, 348, 754; 429/97, 100; 455/575.1, 455/575.8, 128; 361/700; 174/50
See application file for complete search history.

(56) References Cited

U.S. PATENT DOCUMENTS

| | | | | |
|---|---|---|---|---|
| 5,955,700 | A | * | 9/1999 | Slipy et al. .................... 174/50 |
| 2004/0224220 | A1 | * | 11/2004 | Wang et al. ................... 429/96 |
| 2006/0126298 | A1 | * | 6/2006 | Liu et al. ..................... 361/700 |
| 2006/0139856 | A1 | * | 6/2006 | Liu et al. ..................... 361/600 |
| 2006/0141344 | A1 | * | 6/2006 | Chen et al. .................... 429/97 |
| 2006/0148442 | A1 | * | 7/2006 | Liu et al. ..................... 455/347 |
| 2006/0154136 | A1 | * | 7/2006 | Ge et al. ....................... 429/97 |
| 2007/0015477 | A1 | * | 1/2007 | Tu et al. ...................... 455/128 |
| 2007/0117598 | A1 | * | 5/2007 | Yang et al. ............... 455/575.1 |
| 2007/0166608 | A1 | * | 7/2007 | Tu et al. ........................ 429/97 |

* cited by examiner

*Primary Examiner*—Chandrika Prasad
(74) *Attorney, Agent, or Firm*—Jeffrey T. Knapp

(57) ABSTRACT

A battery cover assembly includes a battery cover (20), a housing (10), and a locking member (30). The battery cover has a receiving hole (16) defined therein. The receiving hole is located proximate to one end of the battery cover. The housing has a locking part (19) defined in one end thereof. The locking part includes a receiving groove (192) and a resisting portion protruding from a bottom of the receiving groove. The locking member has an operating portion (32) and a latching ear (34). The operating portion is rotatably mounted in the receiving hole of the battery cover. The latching ear extends from one side of the operating portion. The latching ear is configured so as to be releasably engageable with the locking part of the housing.

16 Claims, 6 Drawing Sheets

BATTERY COVER ASSEMBLY FOR PORTABLE ELECTRONIC DEVICE

FIELD OF THE INVENTION

The present invention generally relates to battery cover latching assemblies and, more particularly, to a battery cover latching assembly for use in a portable electronic device.

DESCRIPTION OF RELATED ART

Batteries are widely used in portable electronic devices, such as personal digital assistants (PDAs), mobile phones, and so on. Conventional batteries are removably received in the electronic device, and battery covers are designed to connect with housings of the electronic devices to package the batteries. The battery has to be replaced by opening the battery cover when, for example, the battery is damaged or dead (e.g., no longer rechargeable).

A clasp structure or latch structure is used with a conventional battery cover, to engage the cover with a housing of a portable electronic device. For example, a typical mobile phone has a latch for the battery cover. The latch includes a pair of hooks at one end of the battery cover, and a locking pin protruding from the other end of the battery cover. Accordingly, a pair of grooves is defined in an end portion of a back side of a housing of the mobile phone, and a locking hole is defined in the other end portion of the back side of the housing. In assembly, the hooks are firstly inserted into the grooves in the back side of the housing. Then, the battery cover is pressed downwardly towards the housing until the locking pin on the battery cover is engaged in the locking hole of the back side of the housing. The battery cover is thus assembled to the housing of the mobile phone. The battery cover is simple in structure, and the engagement between the battery cover and the housing of the mobile phone is firm. However, when detaching the battery cover, relatively great force needs to be exerted thereon. Therefore it can be awkward for a user to detach the battery cover, and the battery cover is susceptible to damage during such operation.

A new battery cover latching assembly is desired in order to overcome the above-described shortcomings.

SUMMARY OF THE INVENTION

In one preferred embodiment, a battery cover assembly includes a battery cover, a housing, and a locking member. The battery cover has a receiving hole defined therein. The receiving hole is located proximate to one end of the battery cover. The housing has a locking part defined in one end thereof. The locking part includes a receiving groove and a resisting portion protruding from a bottom of the groove. The locking member has an operating portion and a latching ear. The operating portion is rotatably mounted in the receiving hole of the battery cover. The latching ear extends from one side of the operating portion. The latching ear is movably the locking part of the housing. When the latching ear moves to abut a first side of the resisting portion in the receiving groove, the operating portion is rotated to a predetermined angle such that the latching ear abuts an opposite second side of resisting portion.

Other advantages and novel features of preferred embodiments of the present battery cover latching assembly and its applications will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present battery cover latching assembly. Moreover, in the drawings, like reference numerals designate corresponding parts throughout the several views.

DETAILED DESCRIPTION OF THE INVENTION

A battery cover assembly of the present invention is suitable for applications including portable electronic devices, such as mobile phones, PDAs, and so on.

Figure 1:
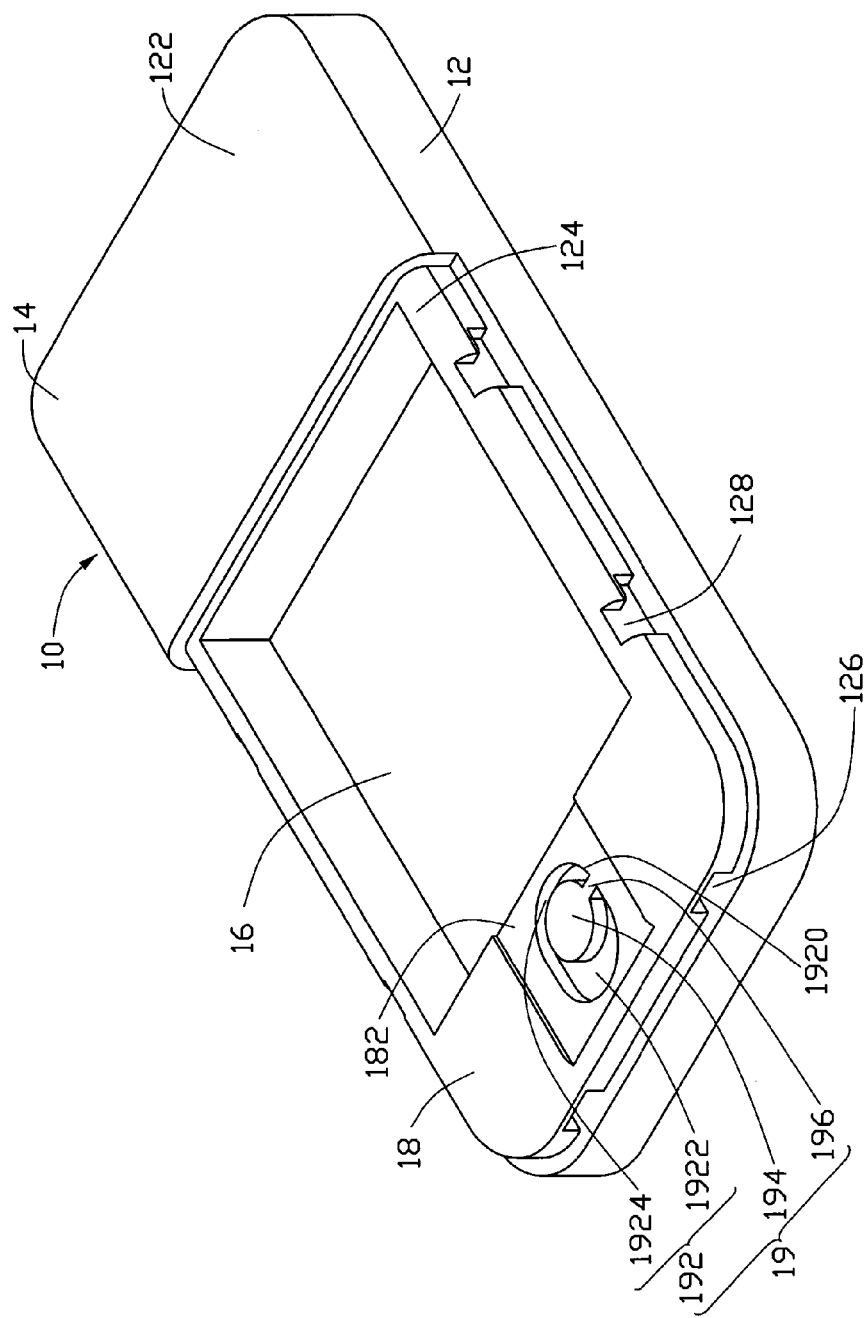
FIG. 1 is an isometric, inverted view of a housing of an exemplary portable electronic device, the housing including certain components of a battery cover assembly in accordance with a preferred embodiment of the present invention.
Figure 2:
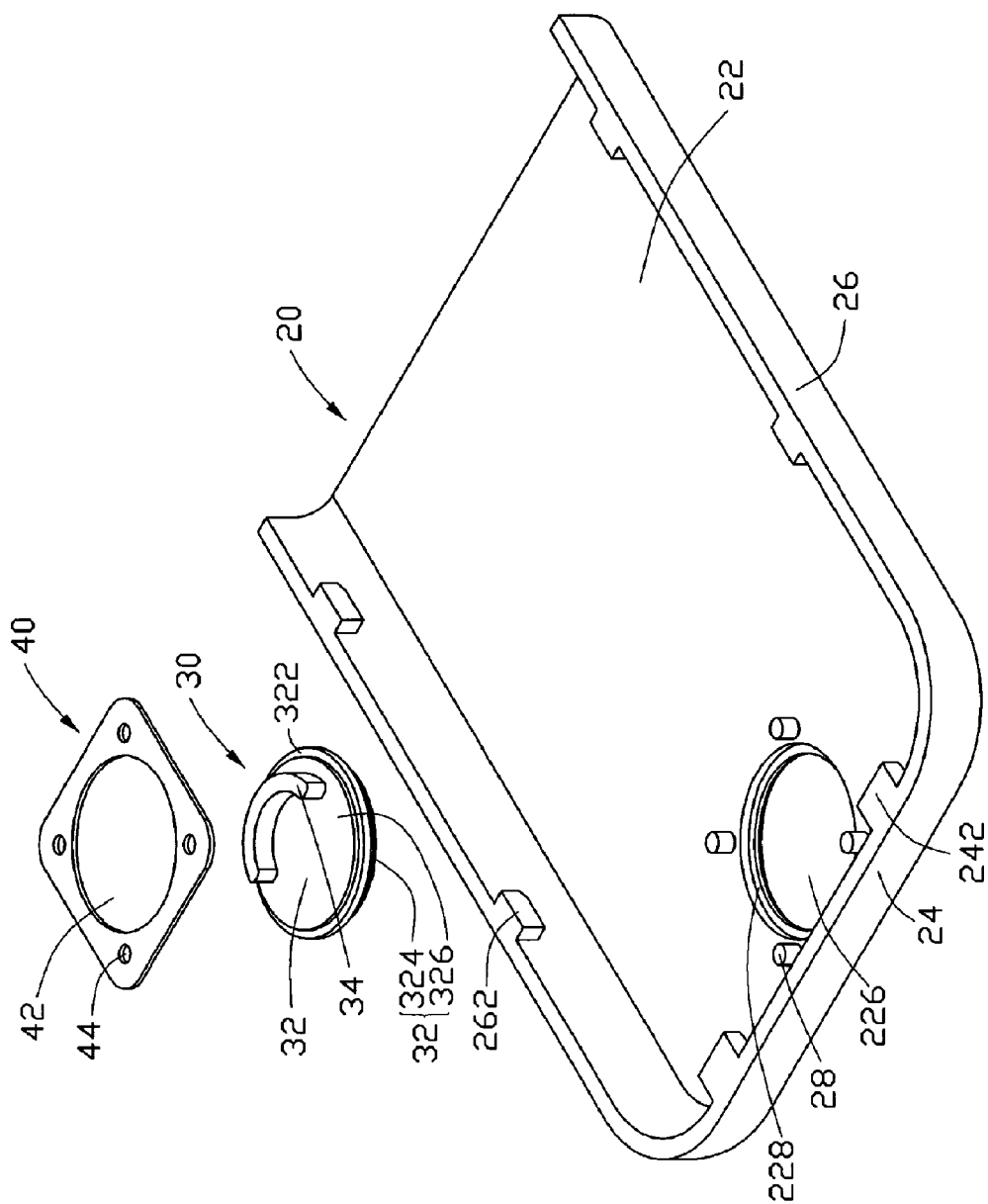
FIG. 2 is an exploded, isometric view of other components of the battery cover assembly in accordance with the preferred embodiment, the other components including a battery cover.
Figure 4:
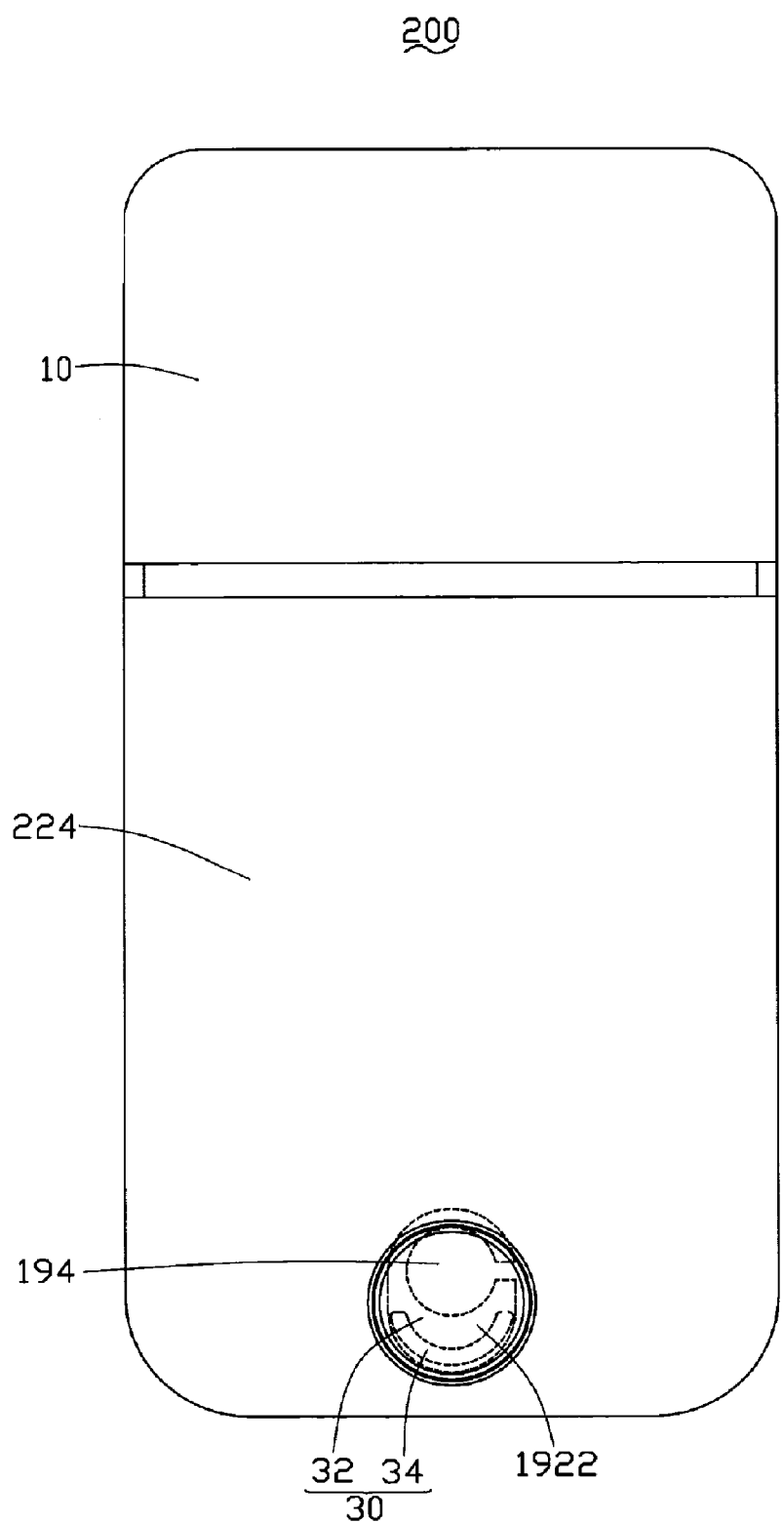
FIG. 4 is a bottom plan view of the portable electronic device having all the components of the battery cover assembly, showing in phantom positions of certain components during a process of attaching the battery cover to the housing.
Figure 5:
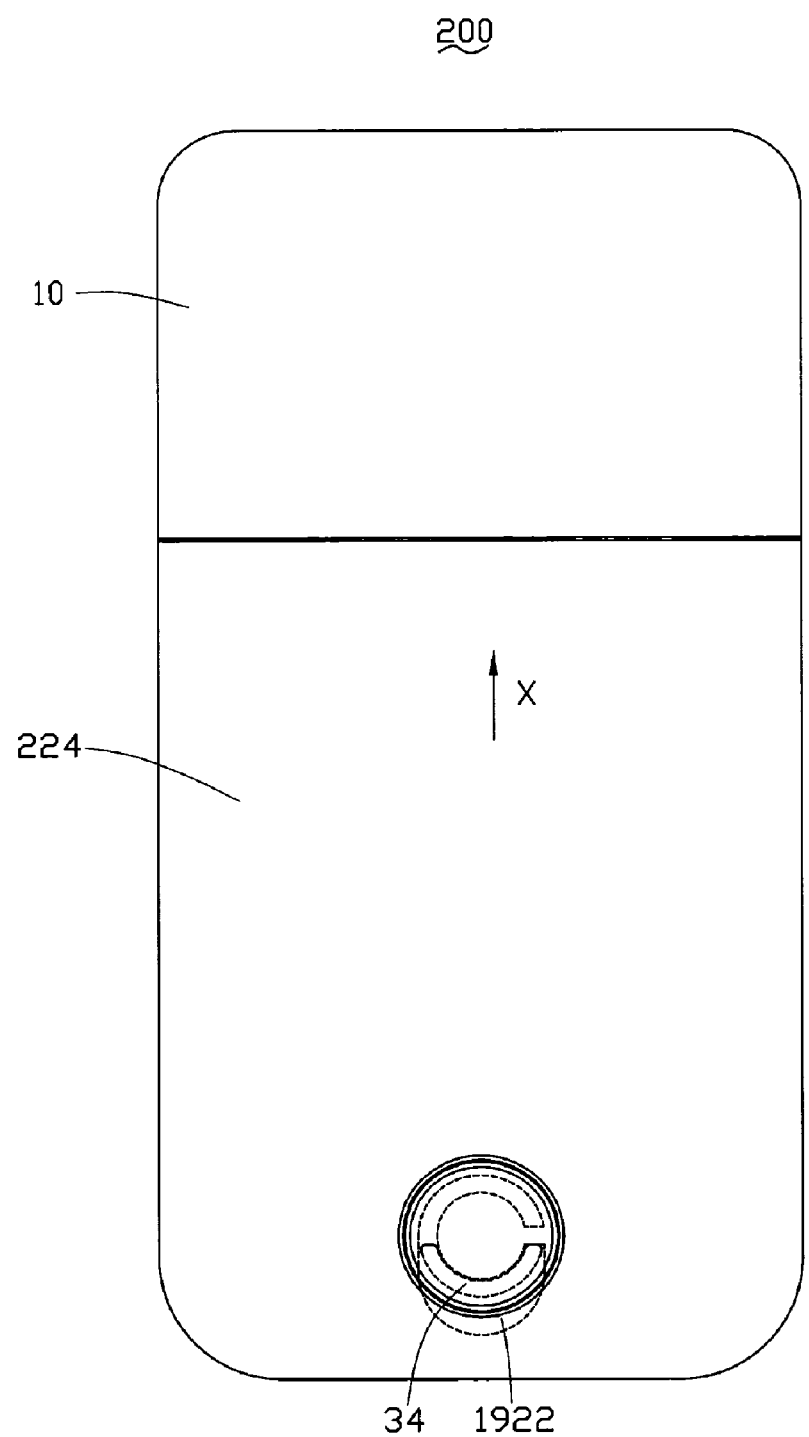
FIG. 5 is similar to FIG. 4, but showing the battery cover in an unlocked state.
Figure 6:
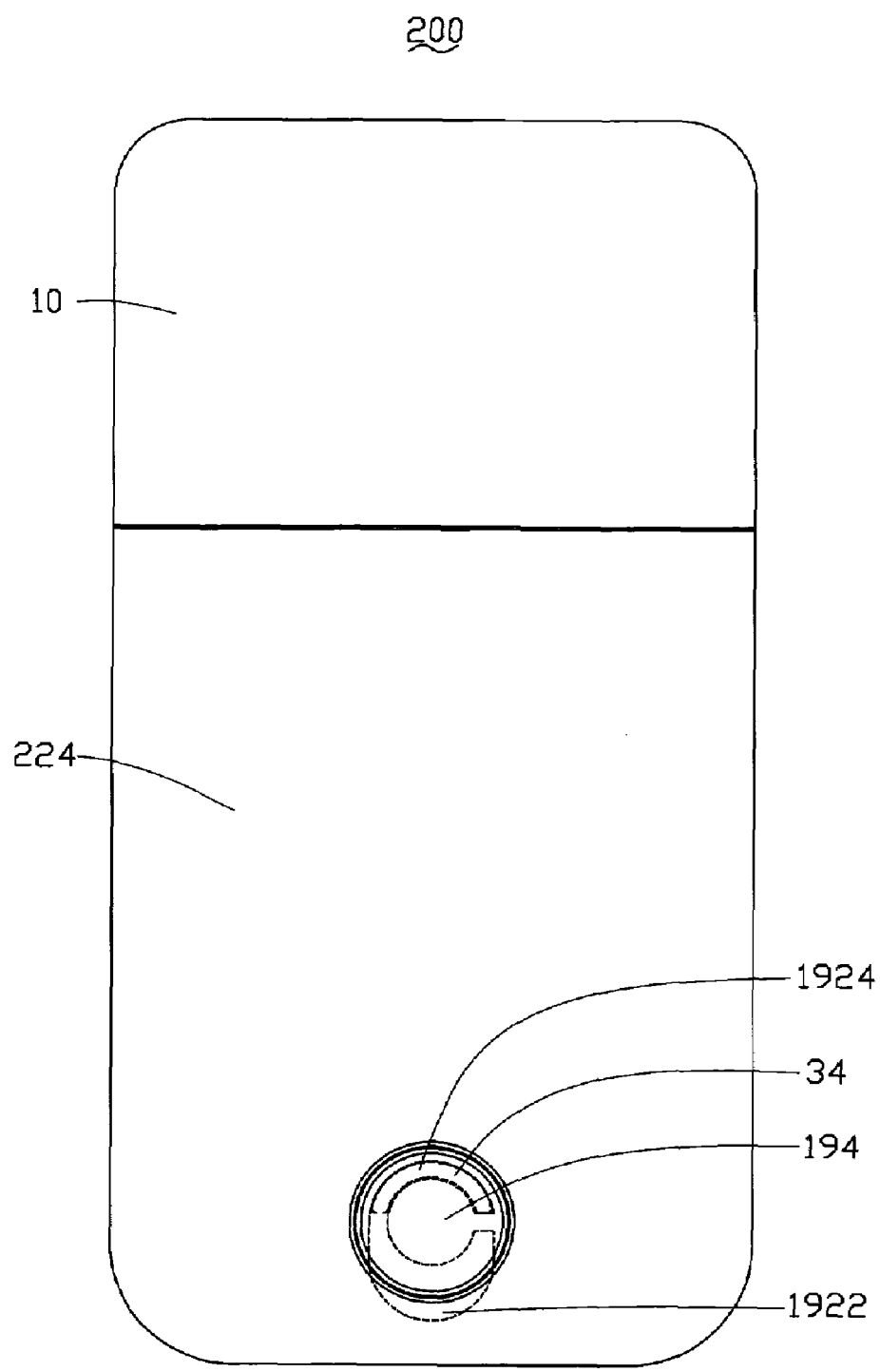
FIG. 6 is similar to FIG. 5, but showing the battery cover in a locked state.

Referring now to the drawings in detail, FIG. 1 and FIG. 2 show various parts of a battery cover assembly incorporated in a mobile phone/portable electronic device 200 (best seen in any of FIGS. 4-6). The mobile phone 200 is taken here as an exemplary application, for the purposes of describing details of a battery cover assembly of a preferred embodiment of the present invention. The mobile phone 200 includes a housing 10, and a battery cover 20. The battery cover assembly includes the battery cover 20, a locking part 19 defined in the housing 10, a locking member 30, a washer 40, and an engaging mechanism (not labelled). The locking member 30 is rotatably attached to the battery cover 20. Accordingly, the battery cover 20 is engaged with the housing 10 of the mobile phone 200 by means of the locking member 30.

Referring to FIG. 1, the housing 10 includes a main body 12. The main body 12 includes a rear surface portion 122, facing the battery cover 20. The main body 12 has a recessed portion 124 defined in the rear surface portion 122 thereof, thus dividing the rear surface portion 124 into a upper portion 14 and the recessed portion 124. The recessed portion 124 is of such dimensions as to allow it to receive the battery cover 20. The main body 12 defines a substantially rectangular chamber 16 in the recessed portion 124 and adjacent to the upper portion 14, thus forming a lower portion 18 opposite to the upper portion 14. The chamber 16 is used to receive a battery (not shown). The lower portion 18 defines a substantially rectangular depressed portion 182. The locking part 19 is formed at a bottom of the depressed portion 182. The locking part 19 includes a receiving groove 192, a round portion 194 functioning as a resisting portion protruding from a bottom of the receiving groove 192, and a connecting portion 196 interconnecting an inner peripheral wall 1920 of the receiving groove 192 and the round portion 194. The receiving groove 192 is generally ellipsoid-shaped. A major axis of the receiving groove 192 is parallel to a longitudinal direction of the housing 10. The round portion 194 deflects away from a center of the receiving groove 192, thus dividing the receiving groove 192 into a larger mounting groove 1922 and an opposite locking groove 1924. The locking groove 1924 is located adjacent to the chamber 16. A size of the mounting groove 1922 is larger than that of the locking groove 1924. The mounting groove 1922 communicates with the locking groove 1924. The main body 12 defines two detents 126 in a distal end of the lower portion 182 thereof. The main body 12 also defines a plurality of catch slots 128 defined in two opposite sides of the recessed portion 14.

The battery cover 20 includes a main body 22, a top wall 24, and two opposing sidewalls 26. The main body 22 includes an inner surface 222 (labeled in FIG. 3) which, together with the top wall 24 and the sidewalls 26, defines a substantially rectangular space (not labeled) for receiving a battery. The main body 22 includes an outer surface 224 (see FIG. 4) opposite to the inner surface 222. The main body 22 defines a circular receiving hole 226 extending therethrough and adjacent to the top wall 24. A circular groove 228 surrounding the receiving hole 226 is formed in the inner surface 222. A plurality of positioning pins 28 are formed on the inner surface 222 and surround the circular groove 228. Two latches 242 extend inwards from a distal end of the top wall 24, for engaging with the detents 126 of the housing 10. Similarly, a plurality of small hooks 262 extend from the sidewalls 26, for engaging in the catch slots 128 of the housing 10. The engaging mechanism includes the detents 126, the catch slots 128, the latches 242, and the hooks 262.

Figure 3:
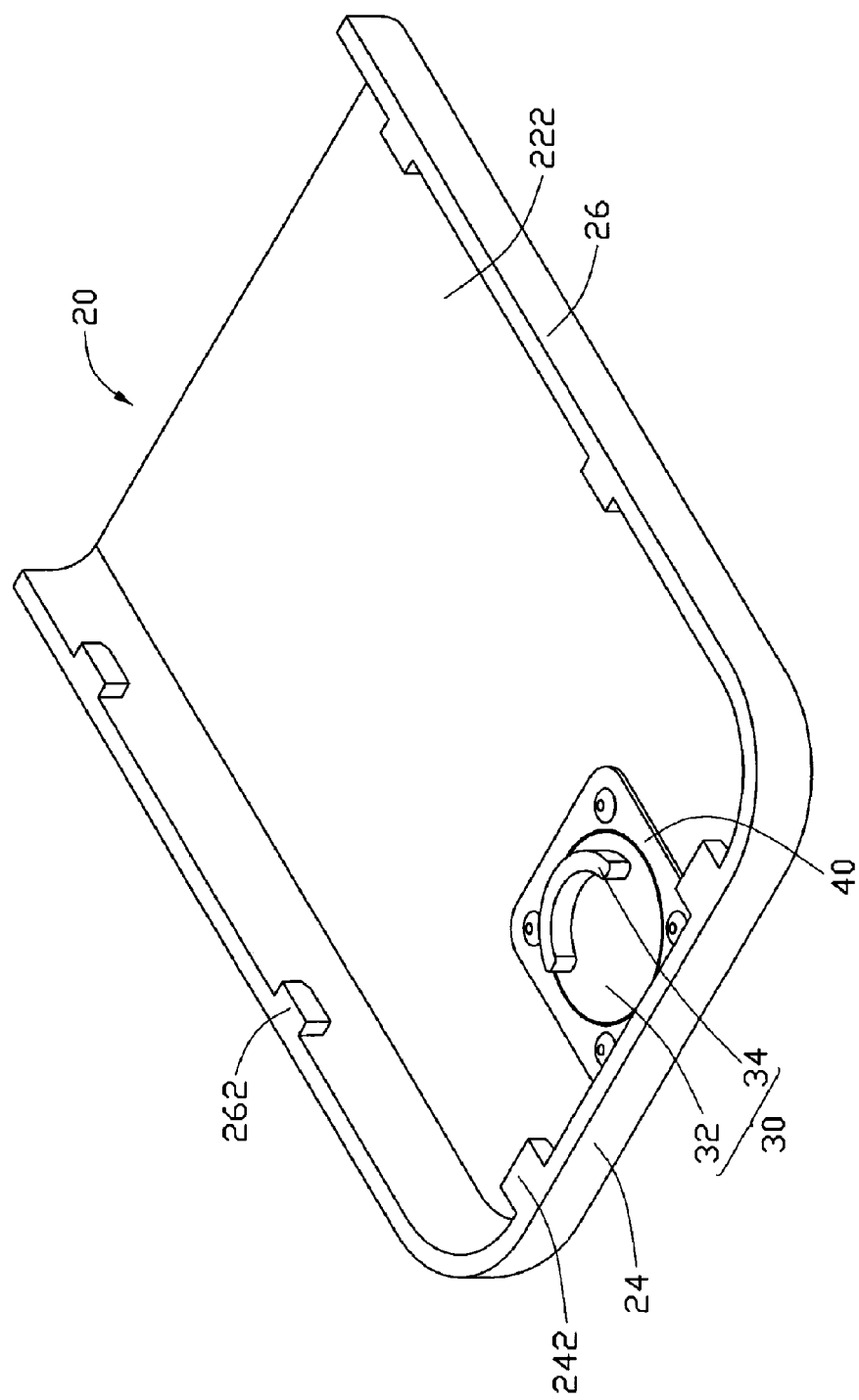
FIG. 3 is an assembled view of the components of the battery cover assembly shown in FIG. 2.

Referring to FIG. 3, the locking member 30 is rotatably mounted on the battery cover 20. The locking member 30 includes an operating portion 32, and a latching ear 34 protruding from one surface of the operating portion 32. The operating portion 32 is disk-shaped. The operating portion 32 has an annular bead 322, thus dividing the operating portion 32 into a top portion 324 and a bottom portion 326. The bottom portion 326 is configured to be able to be manipulated by hand or by using a suitable tool, so that the operating portion 32 can be rotated by a user. The latching ear 34 is semi-annular shaped or arc-shaped. A size of the latching ear 34 corresponds to that of the locking groove 1924 of the housing 10.

The washer 40 is a substantially rectangular thin sheet and has a center hole 42 therein. Four symmetrical positioning holes 44 are defined in four corners of the washer 40, for receiving the positioning pins 28. The shape and size of a center hole 42 corresponds to that of the operating portion 32. The thickness of the washer 40 is equal to a depth of the depressed portion 182.

In pre-assembly, the operating portion 32 of the locking member 30 is received in the receiving hole 226 of the battery cover 20, with the annular bead 322 received in the circular groove 228, and the bottom portion 326 exposed from the outer surface 224 of the battery cover 20. The washer 40 is placed on the inner surface 222 of the battery cover 20, with the positioning holes 44 receiving the respective positioning pins 28 of the battery cover 20. At this point, the washer 40 can then advantageously be attached to the battery cover 20 by melting the positioning pins 28 of the battery cover 20. Thereby, a battery cover assembly including the battery cover 20, the locking member 30, and the washer 40 is obtained. For convenience, this battery cover assembly will hereinafter simply be referred to as the battery cover 20.

Next, referring also to FIGS. 4-6, the battery cover 20 is attached to the housing 10 as follows. The battery cover 20 is placed on the recessed portion 124 of the housing 10, with the latches 242 aligned with the detents 126 of the housing 10 and the hooks 262 received in lowermost end portions of the catch slots 128 of the housing 10. The washer 40 is received in the depressed portion 182 of the housing 10. The latching ear 34 of the locking member 30 is received in the mounting groove 1922 of the housing 10, with the latching ear 34 abutting a lowermost end portion of the inner peripheral wall 1920 of the receiving groove 192. Referring to FIG. 5, the battery cover 20 is pushed toward the upper portion 14 of the housing 10 in a direction as shown by the "X" arrow until the battery cover 20 completely covers the recessed portion 124 of the housing 10. In this position, the latching ear 34 of the battery cover 20 abuts the round portion 194, the latches 242 of the battery cover 20 are completely engaged in the detents 126, and the hooks 262 of the battery cover 20 are completely engaged in the catch slots 128 of the housing 10. Referring to FIG. 6, the locking member 30 can then be rotated about 180 degrees by manipulating the bottom portion 326 of the locking member 30 until the latching ear 34 is locked in the locking groove 1924. As a result, the latching ear 34 of the locking member 30 is stably locked in the locking part 19 of the housing 10, and the battery cover 20 cannot be pushed forwards or backwards. That is, the battery cover 20 is removably attached on the housing 20. During the above process, it can be readily realized that the locking member 30 can be located at a locked position, thereby permitting the battery cover 20 to be stably attached on the housing 20.

When the battery cover 20 is detached from the housing 10, the locking member 30 is rotated about 180 degrees so that the latching ear 34 of the locking member 30 disengages from the locking groove 1924 and is received in the mounting groove 1922. Then the battery cover 20 is pushed away from the upper portion 14 of the housing 10 until the latches 242 disengage from the detents 126 and the hooks 262 of the battery cover 20 reach the lowermost end portions of the catch slots 128 of the housing 10. Then the battery cover 20 can be easily pulled away from the housing 10.

In alternative embodiments, the washer 40 may be pasted on or otherwise adhered to the battery cover 20 by, for example, glue or an epoxy.

As described above, the preferred embodiment provides a battery cover assembly for devices such as a mobile phone 200. When the locking member is rotated, the battery cover 20 can be easily detached. This configuration allows convenient operation of the device. Also, when the battery cover 20 is attached to the housing 10, the latching ear 34 of the locking member 30 is stably locked in the locking part 19 of the housing 10. Thus, the battery cover 20 can be stably attached on the housing 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly, comprising:
    a battery cover, the battery cover having a receiving hole defined therein, the receiving hole being located proximate to one end of the battery cover;
    a housing, the housing having a locking part formed in one end thereof, the locking part including a receiving groove and a resisting portion protruding into the receiving groove; and
    a locking member, the locking member having an operating portion and a latching ear, the operating portion rotatably mounted in the receiving hole of the battery cover, and the latching ear protruding from one side of the operating portion and being movably received in the receiving groove; wherein
    when the battery cover is loosely attached on the housing in a first position, the latching ear is received in the receiving groove distal from the resisting portion;
    when the battery cover is slid to a second position, the latching ear abuts a first side of the resisting portion in the receiving groove; and
    when the operating portion is rotated a predetermined angle, the latching ear abuts an opposite second side of the resisting portion such that the battery cover is locked on the housing.

2. The battery cover assembly as claimed in claim 1, wherein the receiving groove is generally ellipsoid-shaped.

3. The battery cover assembly as claimed in claim 2, wherein the receiving groove includes a mounting groove and a locking groove, with the resisting portion located between the mounting groove and the locking groove, and a size of the locking groove corresponds to a size of the latching ear.

4. The battery cover assembly as claimed in claim 3, wherein the latching ear is semi-annular shaped or arc-shaped.

5. The battery cover assembly as claimed in claim 1, further comprising a washer, the washer being attached to the battery cover such that the locking member is rotatably secured in the battery cover.

6. The battery cover assembly as claimed in claim 5, wherein the washer has a center hole corresponding to the receiving hole of the battery cover, such that the latching ear of the locking member is exposed from the battery cover.

7. The battery cover assembly as claimed in claim 5, wherein the washer has a plurality of positioning holes, and the battery cover has a plurality of positioning pins, and the washer is secured to the battery cover via the engagement of the positioning pins in the positioning holes.

8. The battery cover assembly as claimed in claim 1, wherein a plurality of hooks are formed on opposite sidewalls of the battery cover, a plurality of catch slots are defined in opposite sidewalls of the housing, and the hooks are detachably engaged in the catch slots when the battery cover is in the second position.

9. The battery cover assembly as claimed in claim 1, wherein two latches are formed at one end of the battery cover, two detents are defined in one end of the housing, and the latches are detachably engaged in the detents when the battery cover is in the second position.

10. A portable electronic device, comprising:
    a battery cover, the battery cover having a receiving hole defined therein, the receiving hole being located proximate to one end of the battery cover;
    a housing, the housing having a locking part formed adjacent to one end thereof; and
    a locking member, the locking member having an operating portion and a latching ear, the operating portion being rotatably mounted in the receiving hole of the battery cover, the latching ear extending from one side of the operating portion, the latching ear being configured so as to be slidably and rotatably received in the locking part of the housing;
    when the latching ear is slid a predetermined distance in the locking part, the latching ear can then be rotated a predetermined angle to be locked in the locking part such that the battery cover is removably locked to the housing wherein, the locking part has a receiving groove and a round portion protruding into the receiving groove.

11. The portable electronic device as claimed in claim 10, wherein the receiving groove includes a mounting groove and a locking groove, with the round portion located between the mounting groove and the locking groove, and a size of the locking groove corresponds to a size of the latching ear.

12. The portable electronic device as claimed in claim 10, further comprising a washer, the washer having a center hole corresponding to the receiving hole of the battery cover, such that the latching tab of the locking member is exposed from the battery cover.

13. The portable electronic device as claimed in claim 12, wherein the washer has a plurality of positioning holes, and the battery cover has a plurality of positioning pins, and the washer is secured to the battery cover via engagement of the positioning pins in the positioning holes.

14. The portable electronic device as claimed in claim 10, further comprising an engaging mechanism, the engaging mechanism being configured for detachably engaging the battery cover with the housing.

15. The portable electronic device as claimed in claim 14, wherein the engaging mechanism comprises a plurality of hooks formed on opposite sidewalls of the battery cover, and a plurality of catch slots defined in opposite sidewalls of the housing, with the hooks detachably engaging in the catch slots.

16. The portable electronic device as claimed in claim 14, wherein the engaging mechanism comprises two latches formed at one end of the battery cover, and two detents defined in one end of the housing, with the latches detachably engaging in the detents.

* * * * *